United States Patent [19]

Kuramochi et al.

[11] 4,372,740
[45] Feb. 8, 1983

[54] MOLDING APPARATUS

[75] Inventors: Hiroshi Kuramochi; Ryuichi Toyoda, both of Saitama, Japan

[73] Assignee: Kokoku Rubber Industrial Company Limited, Tokyo, Japan

[21] Appl. No.: 236,370

[22] Filed: Feb. 20, 1981

[30] Foreign Application Priority Data

Mar. 31, 1980 [JP] Japan ............................. 55-40199

[51] Int. Cl.³ .......................... B29G 3/00; B29F 1/06
[52] U.S. Cl. ................................ 425/544; 264/328.7; 425/588
[58] Field of Search ........................ 264/328.7, 40.5; 425/544, 588

[56] References Cited

U.S. PATENT DOCUMENTS 3,793,415  2/1974  Smith ..................... 264/328.7 X

*Primary Examiner*—Thomas P. Pavelko
*Attorney, Agent, or Firm*—Thomas R. Morrison

[57] ABSTRACT

This invention relates to a molding apparatus capable of producing flashless molded parts due to a perfect surface-to-surface mating of a pair of molds. The molding apparatus comprises an upper holding means for holding at least one upper mold having a path in which a moldable material is passable, and a lower holding means for holding at least one lower mold having a cavity, wherein a certain amount of fluid substance is filled between a bottom surface of the lower mold and the lower holding means, thereby the lower mold being floatable on the fluid substance and movable along the lower holding means, subsequently a joint between the upper mold bottom surface and the lower mold top surface being realized perfectly due to a back pressure of the fluid substance.

5 Claims, 4 Drawing Figures

MOLDING APPARATUS

BACKGROUND OF THE INVENTION

This invention relates to molding apparatus for producing flashless molded parts on a mold-to-mold joint surface when molding high-molecular compounds such as plastic material, rubber, etc.

Such molding apparatus for producing flashless molded parts requiring no trimming are known in U.S. Pat. Nos. 2,883,704 (hereinafter called "A"), 3,070,843 (hereinafter called "B"), 3,121,918 (hereinafter called "C"), and Japanese Unexamined Patent Publication No. 48-72258 (hereinafter called "D"), etc.

Reference "A" relates to a transfer molding apparatus, wherein a plurality of cavities are mounted on a resilient plate, in each of which a compound surpassing sufficiently a filling capacity of each cavity can be inserted and then hardened.

It is unfeasible for the above transfer molding apparatus to produce flashless molded parts effectively by reason that a certain moldable material remaining in the transfer device is forced to be hardened. Accordingly, a loss of the moldable material is large.

Reference "B" relates to improvements of the aforementioned disadvantage. After a certain amount of moldable material is filled in a cavity, only the cavity itself is transferred into a heating and thermosetting device and finally hardened therein. Also in reference "B", it is not possible to produce flashless molded parts effectively. The remaining moldable material is not hardened, but it is demanded to install at least two pressure applying devices. Accordingly, the molding cost becomes expensive.

Reference "C" is substantially identical to Japanese Examined Patent Publication No. 41-4837. According to a remarkable aspect of this technique, a chamber is mounted upon an upper surface of lower heat plate, and the upper surface of the chamber is covered by a diaphragm. A certain liquid of heat resistance is filled in the chamber and placed under a pressure application. The diaphragm is deflected by the pressurized medium or liquid in order to maintain a very close contact between the adjacent molds.

The molding technique of reference "C" is more superior to the above two references "A" and "B". And, as far as only a single or few cavities are installed to the molding apparatus according to reference "C", it is possible to produce flashless molded parts. However, this apparatus is unable to produce flashless molded parts when installing molds having many cavities.

Reference "D" relates to a molding apparatus of an elastomeric material and its process. According to the technique of reference "D", an insulating plate of heat resistance is filled between transfer means and respective curing cavity. A sufficient moldable material surpassing the capacity of the cavity is filled in the cavity. Without separating the insulating plate, only the moldable material within the cavity is hardened so as to prevent hardening of the moldable material remaining in the transfer means.

According to one aspect of this technique, a heating process and a thermosetting process are carried out continuously by one operation. However, the disadvantage is that the hardening time becomes longer and a shortage of hardening may be caused. In addition, a specifically arranged heat insulating plate must be prepared. Thus, there exists a number of inconveniences and defects.

The aforementioned known techniques are not yet actually used in the industrial world. This is likely to be due to the fact that a surface-to-surface contact of adjacent molds requires very severe accuracy, that is, an accurate parallel of not more than 1/1000 mm in a mold-to-mold joint. It may be technically feasible to produce only one flashless molded part. However, when molding a plurality of flashless molded parts simultaneously, it is required to control a surface contact of the molds with respective cavities very accurately and perfectly, but it is still technically feasible.

The defects and disadvantages of the conventional techniques may be summarized as follows:

(1) The moldable material is forced to remain in the transfer means, so that it is thermoset therewithin.

(2) In case of an injection molding, part of the moldable material remains in a sprue runner.

(3) In order to avoid the loss of the moldable material which will remain in the transfer means, various means have been developed. For example, it is necessary to install means for preventing a back flow of the moldable material, but its installation cost is expensive.

(4) In order to remove the loss of the remaining moldable material, a flexible heat-insulating material may be mounted between transfer means and a cavity. However, a heat conductivity is prevented and operational efficiency is declined. Further, since the heat-insulating material must be prepared specifically, the molding cost is increased.

(5) Any deformation of the molds as well as of the clamping means that is caused by a high heat or high pressure function at the molding time cannot be released by the remaining moldable material.

(6) In order to release the deformation, each mold is produced so as to have a certain resilience. However, it is limited to release the deformation of such a rigid mold.

(7) A chamber covered by a diaphragm is incorporated in a lower mold clamping means. According to U.S. Pat. No. 3,121,918, a heat-insulating liquid is filled in the above chamber in order to remove any deformation of the molds and of the clamping means. However, it is impossible to transmit a uniform pressure force to the cavity by the following reasons:

(i) The diaphragm must be of considerable strength in order to cope with a mold clamping force. Accordingly, it must be made of a metal material. Needless to say, the metal-made diaphragm is not able to have a sufficient flexibility. When using such a diaphragm, it is impossible to carry out a slight control of a 1/1000 mm level in a surface-to-surface joint of a pair of molds.

(ii) As far as any one of the molds having a larger dimensional error or a parallel degree of the mold surface being in disorder, it is impossible to obtain a complete surface-to-surface joint of adjacent molds.

(iii) Since such a metal-made diaphragm has no sufficient flexibility, it is impossible to mount a large number of molds upon the diaphragm. Only a few molds may be mounted thereupon.

BRIEF SUMMARY OF THE INVENTION

It is a general object of this invention to provide a molding apparatus which enables production of flashless molded parts by making perfect a surface-to-surface joint of a pair of molds.

Speaking more in detail, the molding apparatus comprise an upper holding means for holding at least one upper mold having a path in which a moldable material is passable, and a lower holding means for holding at least one lower mold having a cavity, wherein a certain amount of fluid substance is filled between a bottom surface of the lower mold and the lower holding means, thereby the lower mold being floatable on the fluid substance and movable along the lower holding means, subsequently a joint between the upper mold bottom surface and the lower mold top surface being realized perfectly due to a back pressure of the fluid substance. Accordingly, even if a height of each mold in a large number of mold pairs is different, the back pressure of the fluid substance is applied uniformly to individual lower molds due to a movement of the fluid substance. Thus, a perfect surface-to-surface joint of a pair of molds is obtained.

It is another object of this invention to provide a molding apparatus, in which a perfect surface-to-surface joint of a pair of molds is obtained even though a mold clamping force is insufficient in accuracy or a support plate for supporting each mold is insufficient in a parallel level.

Namely, the lower mold floatable upon the fluid substance has means for controlling parallelism by a sealing member incorporated in the lower mold. Further, there is formed a sufficient space under the lower molds, so that the fluid substance is movable freely.

According to one aspect of this invention, only a surface-to-surface contact of a pair of molds must be accurate. Even if other sections of respective molds such as e.g. height, width, etc. are inaccurate or a larger number of pairs of molds are mounted, the back pressure of the fluid substance is applied uniformly to individual lower molds due to its movement. Thus, the flashless molded parts can be produced in the molding apparatus according to this invention.

According to another aspect of this invention, even in a wastless molding, it is not necessary to mount a special heat-insulating plate. Ordinary heat-insulating plates are acceptable. Accordingly, the molding cost becomes inexpensive.

Other features and advantages of the invention will be apparent from the following description taken in connection with the accompanying drawings.

BRIEF DESCRIPTION OF THE ACCOMPANYING DRAWINGS

PREFERRED EXAMPLES OF THIS INVENTION

Preferred examples of a molding apparatus according to this invention will now be described with reference to the accompanying drawings.

Figure 1:
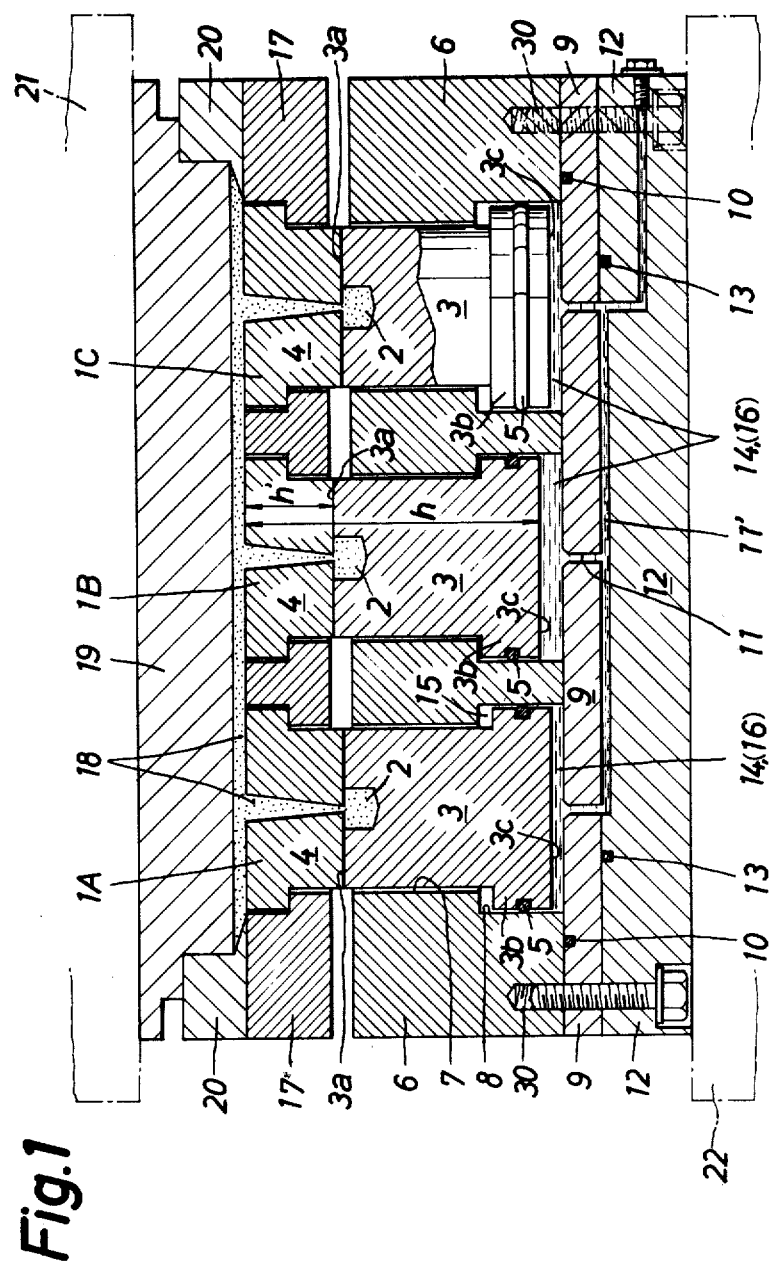
FIG. 1 is a section view of an example of a molding apparatus according to this invention.

Referring first to FIG. 1, a pair of molds 1A (or 1B or 1C) comprise a lower mold 3 having a cavity 2 and an upper mold 4 contacting closely a top surface 3a of the lower mold 3. The lower mold 3 is, at its lower part, provided with a circular flange type lower part 3b, around which circumference is mounted a sealing member 5.

A lower holding means (or a holder) 6 for holding the lower mold 3 has a guide 7, along which the lower mold 3 can be incorporated, and a recess 8 in which the sealing member 5 can be fitted. After the lower mold 3 has been incorporated in the guide 7 as well as in the recess 8, a plate 9 is mounted on a bottom of each holding means 6 by way of a sealing member 10. The plate 9 is provided with a number of passages 11, through which a fluid substance 16 is passable. Further, the plate 9 is mounted on a further plate 12 by way of a sealing member 13. And there is formed a passage 11' between the plates 9 and 12. The fluid substance 16 is also filled in the passage 11'. As shown in FIG. 1, the lower holding means 6 of and two plates 9, 12 of each side are removably fixed by a bolt 30.

Further, there is formed a space 14 between a bottom surface of the lower mold 3 and a top surface of the plate 9. A height of the space 14 can be adjusted and the lower part 3b of the lower mold 3 can be moved upwardly or downwardly within the recess 8. However, its upward movement is restricted by a step 15.

A certain quantity of fluid 16 such as e.g. oil fills the space 14. In the example of FIG. 1 three lower molds 3 are disposed in parallel with each other. The fluid 16 fills the space 14 under each lower mold 3 and flows into the passages 11, 11'.

The fluid 16 may be a viscous fluid which is movable under pressure.

The upper mold 4 is fixed with upper holding means 17 and faces the lower mold 3. The cavity 2 in the lower mold 3 is communicated to an opening of a space in which a moldable material 18 such as rubber, plastics, etc is filled.

Numeral 19 is a piston by which the moldable material 18 can be filled in respective pairs of molds 1A, 1B and 1C under a pressure application. Numeral 20 is a pot linked with the piston 19.

Numerals 21 and 22 are base supports. The piston 19 is fixed with the upper base support 21 and the lowest plate 12 is fixed with the lower base support 22.

An overall height h of a pair of molds 1B positioned in a center of FIG. 1 is a little bit lower than that of other pairs of molds 1A and 1C. That is, a height h' of the upper mold 4 in a pair of molds 1B is a little bit lower than other leftside and rightside upper molds. When the respective upper molds 4 are urged downwardly by the piston 19, its pressure is applied uniformly to each of them. Then, a back pressure of the fluid 16 is preferentially applied to the leftside and rightside bottoms 3C of the lower molds 3. Subsequently, the fluid 16 urged downwardly is applied as a back pressure to the bottom 3C of the lower mold 3 positioned in a center of FIG. 1. Thus, the back pressure of the fluid 16 is uniformly applied to respective lower molds 3.

Despite that a dimensional difference exists between the individual molds, a surface-to-surface joint in a pair of molds 1A (or 1B or 1C) is realized perfectly due to a back pressure of the fluid 16.

According to one aspect of this invention, it is necessary to enhance only accuracy of a contact surface of adjacent molds. It becomes very advantageous for mold manufacture. As described previously, conventionally it was a difficult task to produce flashless molded parts when molding high-molecular compounds using a large number of molds. However, such a difficulty has now been removed completely.

Figure 2:
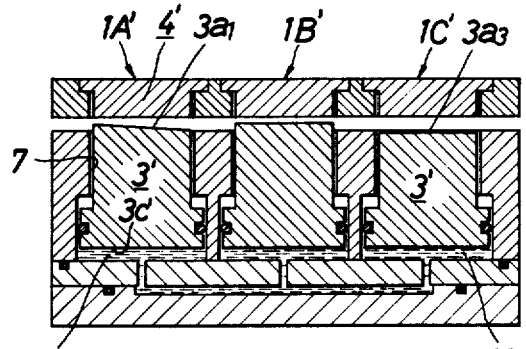
FIG. 2 is a section view of another example of the molding apparatus according to this invention.

Another example of this invention will be described with reference to FIGS. 2 and 3. In this example, a top surface $3a_1$ of a lower mold $3'$ in a pair of molds $1A'$ is inclined slightly. Further, a height of the lower mold $3'$ in a pair of molds $1C'$ is lower than other molds, i.e. a top surface $3a_3$ of the lower mold $3'$ is lowered. In the former case, an internal diameter of the guiding portion 7 is formed to be sufficiently larger than that of the lower mold $3'$. Under such a construction, the inclined top surface $3a_1$ 1 of the lower mold can be jointed closely with a bottom surface of an upper mold $4'$.

Accordingly, even though one lower mold $3'$ is inclined, it is closely contacted with the upper mold $4'$ bottom surface due to a back pressure of the fluid 16. Likewise, even though a height of one lower mold $3'$ is lowered, a pair of molds $1C'$ are closely contacted with each other due to the back pressure of the fluid.

Figure 3:
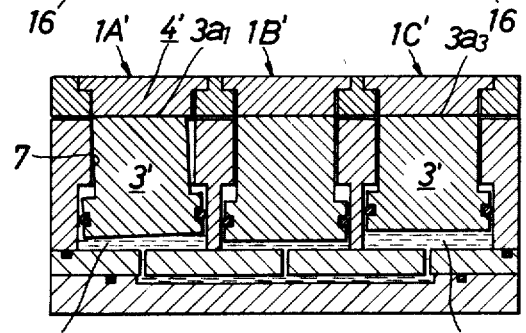
FIG. 3 is a section view of a close mold-to-mold joint in the example of FIG. 2.
Figure 4:
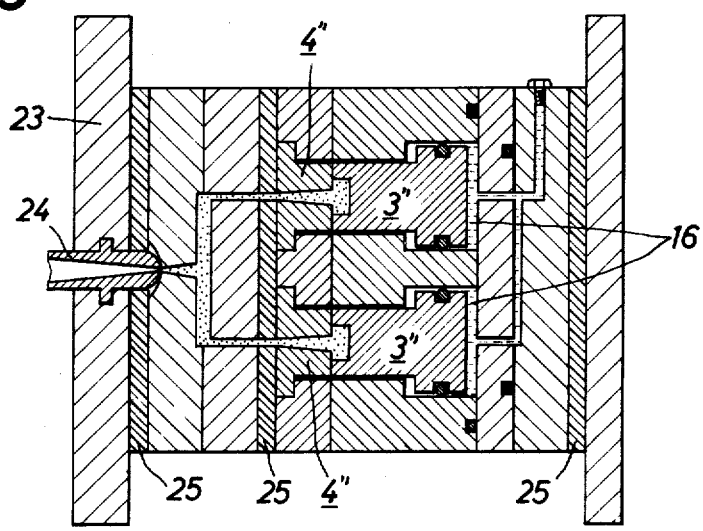
FIG. 4 is a section view of another example of an injection type molding apparatus according to this invention.

FIG. 3 shows an example in which respective pairs $1A'$, $1B'$ and $1C'$ are closely and firmly jointed with each other. An example of FIG. 4 shows a molding apparatus of the injection type.

Likewise in the aforementioned examples, a plurality of pairs of molds are incorporated in the molding apparatus. In order to apply a back pressure to respective bottom surfaces of the lower molds $3''$, $3''$, the fluid substance is filled in a space under the respective bottoms thereof. When the upper molds $4''$, $4''$ are urged by a pressure of a die plate 23, a surface-to-surface joint of respective pairs of molds is realized perfectly due to the back pressure of the fluid 16. Numeral 24 is a nozzle and numeral 25 is a heat insulating material.

In either of the aforementioned examples, the fluid substance is a movable one. However, if the molds are permanently fixed with the molding apparatus without replacing with a new mold, after a first surface-to-surface joint of a pair of molds the fluid substance may be the one that can be hardened. In this case, a position of the back pressure of the fluid 16 is placed permanently under the condition that a surface-to-surface joint of a pair of molds has been carried out closely and firmly. And it becomes unnecessary to mount the sealing members. The fluid substance which will be hardened finally may be, for example, a silicone rubber material or a preferred thermosetting resin.

As described previously, since a certain amount of fluid substance fills a space under respective bottom surfaces of a plurality of molds, a surface-to-surface joint of respective pair of molds is carried out effectively and speedily due to a back pressure of the fluid. Accordingly, only contact surfaces of the upper lower molds must be flattened. Even if a height or length of respective molds is not uniform or the contact surface of a pair of molds is inclined to some extent, respective pairs of molds are closely jointed with each other. For this reason, it becomes possible to completely prevent the occurrence of flash on molded parts.

Further, the aforementioned techniques are applicable for either a transfer molding apparatus or an injection-type molding apparatus.

Still further, since a back pressure of the fluid substance is used, a surface-to-surface joint of a pair of molds is carried out easily, so that it is not required to consider particularly a material of the mold.

As may apparently widely different embodiments of this invention may be made without departing from the spirit and scope thereof, it is to be understood that the invention is not limited to the specific embodiments thereof except as defined in the appended claims.

What is claimed is:

1. Apparatus for flashless molding of parts of moldable material, comprising:
   holding means;
   a first plurality of first mold halves disposed in said holding means;
   a second plurality of second mold halves corresponding to said first plurality;
   each of said first mold halves having a first mating surface sealingly mateable with a corresponding second mating surface of one of said second mold halves;
   a cavity for molding said parts in at least one of said first and second molding halves;
   means for moving said second plurality of second mold halves and said first plurality of first mold halves together until at least one of said first mating surfaces contacts its corresponding second mating surface;
   means for permitting displacement of each of said first mold halves in said holding means whereby all of said first mating surfaces contact their corresponding second mating surfaces;
   said means for permitting displacement including seal members effective to seal a space at an end of each of said first mold halves opposed to its respective first mating surface;
   passages interconnecting all of said spaces; and
   a fluid filling all of said spaces and said passages whereby displacement of any first mold half produces a uniform back pressure on all others of said first mold halves tending to displace them in an opposite direction whereby all of said first mating surfaces are forced into uniform mating contact with their respective second mating surfaces regardless of dimensional inequalities in said first and second pluralities.

2. Apparatus according to claim 1, wherein said means for permitting displacement further includes means for permitting angular motion of each of said first plurality of first mold halves wherein angular variations in said first and second mating surfaces may be compensated.

3. Apparatus according to claim 1, wherein said passages and spaces form a sealed system containing a predetermined quantity of fluid.

4. Apparatus according to claim 1, wherein said fluid is hardenable to a non-flowing state when said mating is performed and thereafter is effective to maintain all of said first mold halves in substantially fixed positions.

5. Apparatus according to claim 1 or 4, wherein said mating is effective to provide flashless molding.

* * * * *